United States Patent [19]
Luecke et al.

[11] Patent Number: 4,643,927
[45] Date of Patent: Feb. 17, 1987

[54] TUBULAR, MULTI-LAYER FILM AND METHOD OF MAKING

[75] Inventors: Robert A. Luecke; Gordon E. Gould, both of Newark, Ohio

[73] Assignee: The Dow Chemical Company, Midland, Mich.

[21] Appl. No.: 756,193

[22] Filed: Jul. 18, 1985

[51] Int. Cl.$^4$ ............... B65D 65/02; B32B 27/08; B32B 31/30
[52] U.S. Cl. ............... 428/36; 428/214; 428/216; 428/515; 428/518; 264/173; 156/244.11
[58] Field of Search ............... 264/173; 428/36, 57, 428/214, 216, 515, 518, 35; 156/244.11, 244.14; 383/113

[56] References Cited

U.S. PATENT DOCUMENTS

| | | | |
|---|---|---|---|
| 3,023,461 | 3/1962 | Sherman | 18/55 |
| 3,024,494 | 3/1962 | Szpila | 18/13 |
| 3,266,092 | 8/1966 | Corbett | 18/14 |
| 3,308,508 | 3/1967 | Schrenk | 18/14 |
| 3,475,789 | 11/1969 | Stroup et al. | 425/462 |
| 3,479,425 | 11/1969 | Lefevre et al. | 264/171 |
| 3,555,128 | 1/1971 | Schrenk | 264/40 |
| 3,737,260 | 6/1973 | Kaye | 425/113 |
| 4,042,661 | 8/1977 | Cook | 264/173 |
| 4,048,428 | 9/1977 | Baird, Jr. | 428/518 |
| 4,185,954 | 1/1980 | Murakami et al. | 425/462 |
| 4,244,914 | 1/1981 | Ranalli et al. | 264/515 |
| 4,285,656 | 8/1981 | Herrington | 425/463 |
| 4,365,949 | 12/1982 | Nash | 425/463 |
| 4,483,891 | 11/1984 | Cerny | 428/35 |
| 4,560,598 | 12/1985 | Cowan | 428/35 |

Primary Examiner—John E. Kittle
Assistant Examiner—James J. Seidleck

[57] ABSTRACT

A tubular film and method for making the film by extrusion provide a multi-layer film having a central layer of barrier material which overlaps itself by a substantial distance along a weld line. The film includes inner and outer adhesive layers positioned on opposite sides of the central barrier layer, which adhesive layers completely encapsulated the central barrier layer. Finally, the film includes inner and outer surface layers. The inner surface layer is positioned within the inner adhesive layer, and the outer surface layer is positioned outside the outer adhesive layer.

16 Claims, 2 Drawing Figures

TUBULAR, MULTI-LAYER FILM AND METHOD OF MAKING

BACKGROUND OF THE INVENTION

The present invention relates to a multi-layer tubular film and a method of making the film by extrusion. More particularly, the present invention relates to a multiple layer extrudate having a core layer which provides a substantially uniform, relatively low oxygen transmission rate therethrough around the entire periphery of the film, including the weld line produced during extrusion of the film.

Film structures including a polyvinylidene chloride layer have in the past been difficult to extrude into tubular form. Extrusion of polyvinylidene chloride, such as Saran (manufactured by The Dow Chemical Company), presents special problems due to the thermal degradation which can occur in the extrusion die. It has been found, however, that by using a multi-component feedblock process in which a polyvinylidene chloride is in the center of the feedblock and therefore moves quickly through the die, extrusion of this material is possible. The polyvinylidene chloride core is, then, encapsulated by a different material, such as a polyethylene. When the feedblock is extruded, the resulting extrudate includes a middle layer of polyvinylidene chloride.

A problem in forming the encapsulated polyvinylidene chloride into a tubular film by extrusion results from the seam produced during the extrusion process. This seam extends along a weld line on one side of the extrudate. Generally, an extrusion die used to produce the tubular extrudate defines an annular chamber into which the extrusion material is forced. The material divides into two substreams which flow in opposite directions around the annular chamber, meeting on the opposite side of the chamber where they recombine. The streams then exit from the annular chamber through an annular opening and, at the point of recombination, define the weld line.

It will be appreciated that if a feedblock having a core of polyvinylidene chloride and an outer, encapsulating polyethylene layer were to be extruded in this fashion, the polyvinylidene chloride core does not recombine along the weld line. Rather, only the encapsulating material recombines at the weld line. Since polyethylene permits a much higher level of gas transmission therethrough than polyvinylidene chloride, a tubular extrudate having non-uniform gas transmission properties is produced. This is particularly undesirable where the extrudate is to be used for containment of a gas-sensitive material. For example, if the tubular film having a gap in the polyvinylidene chloride layer along its weld line were to be utilized for meat storage, the shelf life of the product would be shortened due to the transmission of oxygen through the film in this region. It will be appreciated that a film having non-uniform gas transmission properties would be unacceptable for this and many other applications.

One solution to this problem, as suggested by U.S. Pat. No. 4,042,661, issued Aug. 16, 1977 to Cook, is to extrude coaxially two multi-layer tubular film structures, with the weld lines of the film structures spaced around the periphery of final tubular film which combines these two structures. While providing a solution to the problem discussed above, the Cook '661 patent requires several polyvinylidene chloride layers. Thus, the structure would be too complicated for some applications and, in any event, would require many more layers than should be necessary.

Accordingly, it is seen that there is a need for an extrudate having a core layer which, in tubular form, provides a generally uniform oxygen transmission level therethrough around its periphery and which is simple in construction.

SUMMARY OF THE INVENTION

The tubular, multi-layer film of the present invention may comprise a central, barrier layer, a pair of adhesive layers on opposite sides of the middle, barrier layer, and inner and outer surface layers. The adhesive layers completely cover the central, barrier layer. Opposing edges of the central, barrier layer overlap by a substantial amount along a weld line such that the barrier layer provides substantially uniform gas transmission around its periphery. The inner surface layer extends completely around the interior of the tubular, multi-layer film, and the outer surface layer extends completely around the exterior of the tubular multi-layer film. The inner and outer surface layers protect the barrier layer from degradation.

A tubular film according to the present invention includes a central barrier layer of a relatively gas impermeable film such as, for example, polyvinylidene chloride in which the central barrier layer overlaps by a substantial distance along a weld line. The film includes an inner adhesive layer and an outer adhesive layer which are positioned on opposite sides of the central barrier layer. The adhesive layers completely encapsulate the central barrier layer. Finally, the film includes inner and outer surface layers which may be, for example, polyethylene. The inner surface layer is positioned within the inner adhesive layer and the outer surface layer is positioned outside the outer adhesive layer. The total thickness of the film is in the range of 0.00075–0.006 inch and is preferably approximately 0.002 inch. The central barrier layer may be between 0.00015 and 0.00060 inch thick, and preferably is approximately 0.00025 inch thick. The inner and outer adhesive layer thickness is between 0.00015 and 0.00045 inch each, and like the control barrier layer may preferably be approximately 0.00025 inch thick. The inner and outer surface layers are equal in thickness and together add the total remaining thickness to the film. The central barrier layer overlaps itself by approximately two-thirds of an inch along the weld line, which is sufficient such that the oxygen transmission rate of the tubular film adjacent the weld line is no greater than the oxygen transmission rate through other portions of the tubular film.

A method of making the tubular, multi-layer film comprises the steps of:
(a) extruding a block of material having a polyvinylidene chloride core and an adhesive covering into a first stream having a generally annular cross section and a central layer of polyvinylidene chloride which overlaps itself along a weld line by a substantial distance;
(b) extruding polyethylene into a second stream having a generally annular cross-section, the second stream being positioned within the first stream and joined thereto by adhesive; and
(c) extruding polyethylene into a third stream having a generally annular cross section, the third stream being positioned to surround the first stream and joined thereto by the adhesive.

The step of extruding a block of material having a polyvinylidene chloride core may include the step of extruding the first stream such that the central barrier layer of polyvinylidene chloride overlaps itself by approximately two-thirds of an inch, and the central barrier layer of polyvinylidene chloride is approximately 0.00025 inch in thickness, whereby the central barrier layer provides a generally uniform barrier to the passage of oxygen therethrough around its periphery.

Accordingly, it is an object of the present invention to provide a multi-layer tubular extrudate having a central layer which acts as a barrier layer to limit the transmission of gas therethrough, and in which the extrudate has gas transmission properties in the region of the weld line equivalent to those found in other regions of the extrudate; to provide such an extrudate utilizing polyvinylidene chloride for the central barrier layer; and to provide a method of making such an extrudate.

These and other objects and other advantages of the invention will become apparent from the following detailed description, the accompanying drawings, and the appended claims.

DETAILED DESCRIPTION OF PREFERRED EMBODIMENTS

Figure 1:
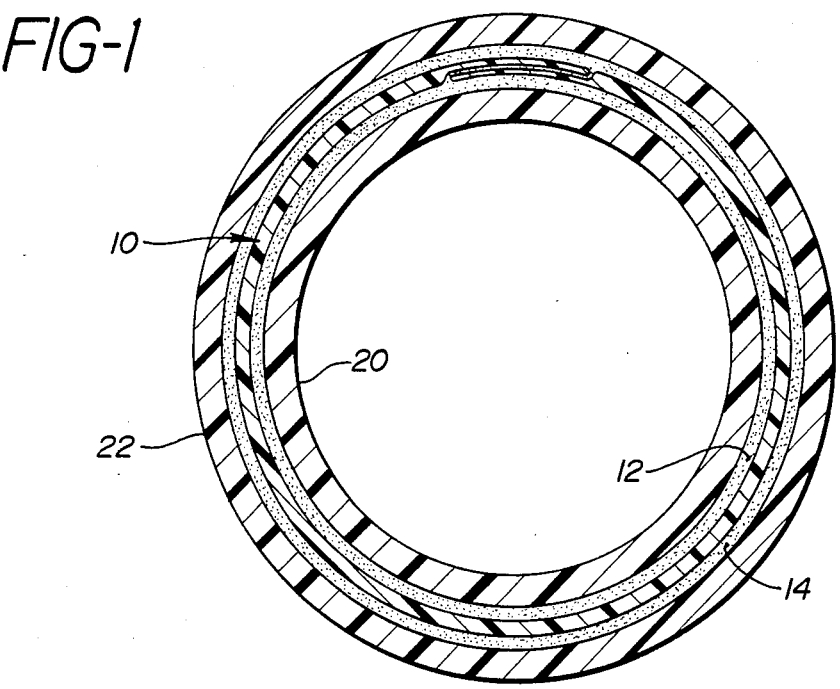
FIG. 1 is a sectional view of the multi-layer tubular extrudate of the present invention, with the individual layer thicknesses greatly exaggerated for purposes of illustration.
Figure 2:
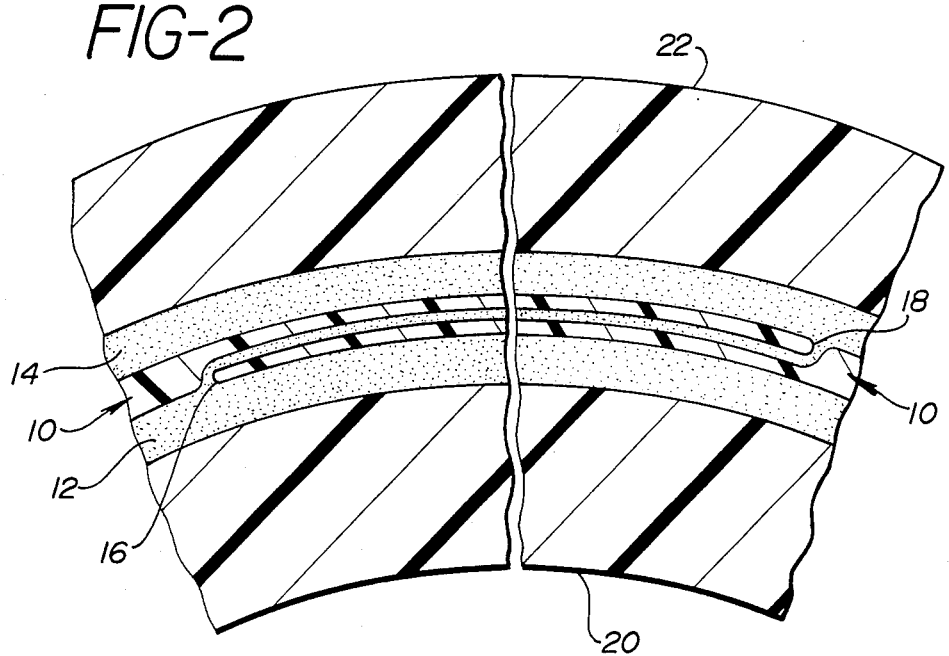
FIG. 2 is a partial sectional view, greatly enlarged, of the extrudate in the region of the weld line.

Reference is made to FIG. 1 and FIG. 2 which are sectional views of the tubular, multi-layer film of the present invention. For purposes of clarity in illustration, the thicknesses of the various layers are exaggerated in FIG. 1 with respect to the size of the tubular laminate. The film comprises a central barrier layer 10 and a pair of adhesive layers 12 and 14 which are positioned on opposite sides of the central barrier layer 10. The barrier layer 10 is preferably a polyvinylidene chloride film, such as Saran, available from The Dow Chemical Company. The adhesive layers 12 and 14 may consist of any one of a number of adhesives, such as for example ethyl vinyl acetate. The adhesive layers 12 and 14 completely cover the central barrier layer 10.

As best seen in FIG. 2, the opposing edges 16 and 18 of the central barrier layer 10 overlap by a substantial amount along the weld line. By this overlapping configuration, the central barrier layer 10 exhibits a substantially uniform oxygen transmission rate at all points around its periphery.

The multi-layer film further includes inner and outer surface layers 20 and 22, respectively. The inner surface layer 20 extends completely around the interior of the tubular, multi-layer film, and the outer surface layer 22 extends completely around the exterior of the tubular, multi-layer film. The surface layers 20 and 22 preferably are formed of polyethylene. As is known, polyvinylidene chloride deteriorates as a result of exposure to ultraviolet radiation. These surface layers block out much of the ultraviolet radiaton, and thus protect the central barrier layer 10 from degradation.

The tubular multi-layer film of the present invention is preferably formed by extrusion. A co-extrusion die, such as shown in U.S. Pat. No. 4,365,949 is utilized to co-extrude three laminate layers simultaneously. Polyethylene extrusion blocks are supplied to the die to extrude the inner and outer surface layers 20 and 22 respectively. To the inlet opening of the die communicating with the middle extrusion passage is supplied an extrusion block consisting of polyvinylidene chloride which is completely encapsulated in an adhesive. This polyvinylidene chloride/adhesive composite extrusion block is extruded into a first stream having a generally annular cross section. The middle extrusion passage is configured to ensure that there is an overlap of the polyvinylidene chloride along the weld line by a substantial distance, as depicted in FIG. 2. This overlap produces an oxygen transmission level in the region of the weld line which is comparable to that provided by the polyvinylidene chloride layer in other areas of the tubular, multi-layer film.

For a polyvinylidene chloride layer of approximately 0.00025 inch thickness, the overlap required is approximately ⅔ inch. In the preferred embodiment, adhesive layers 12 and 14 are each approximately 0.00025 inch in thickness, and the overall thickness of the tubular multi-layer film is approximately 0.002 inch. The adhesive layers 12 and 14 not only bond the polyvinylidene chloride central barrier layer 10 together in overlapping fashion at overlapping edges 16 and 18, but they also join surface layer 20, extruded as a second extrusion stream, and surface layer 22, extruded as a third extrusion stream, to polyvinylidene chloride central barrier layer 10.

While the methods and compositions herein described constitute preferred embodiments of the invention, it is to be understood that the invention is not limited to these precise methods and compositions, and that changes may be made in either without departing from the scope of the invention, which is defined in the appended claims.

What is claimed is:

1. A tubular film, comprising:
   a central barrier layer of polyvinylidene chloride, said central barrier layer overlapping by a substantial distance along a weld line which extends longitudinally along said tubular film.
   an inner adhesive layer and an outer adhesive layer positioned on opposite sides of said central barrier layer, said adhesive layers completely encapsulating said central barrier layer, and
   inner and outer surface layers of polyethylene, said inner surface layer of polyethylene being positioned within said inner adhesive layer and said outer surface layer of polyethylene being positioned outside said outer adhesive layer.

2. The tubular film of claim 1 in which said inner and outer adhesive layers are each between 0.00015 and 0.00045 inch in thickness.

3. The tubular film of claim 1 in which said central barrier layer of polyvinylidene chloride is between 0.00015 and 0.00060 inch in thickness.

4. The tubular film of claim 1 in which the film is in the range of 0.00075–0.006 inch in thickness.

5. The tubular film of claim 1 in which said central barrier layer of polyvinylidene chloride overlaps circumferentially around said tubular film by approximately two-thirds of an inch along said weld line.

6. The tubular film of claim 1 in which said central barrier layer of polyvinylidene chloride overlaps by a distance sufficient such that the oxygen transmission rate of the tubular film adjacent said weld line is no greater than the oxygen transmission rate of other portions of said tubular film.

7. A tubular, multi-layer film, comprising:
a central barrier layer,
a pair of adhesive layers on opposite sides of said central barrier layer, said adhesive layers completely covering said central barrier layer, opposing edges of said central barrier layer overlapping by a substantial amount along a weld line which extends longitudinally along said tubular, multi-layer film such that said central barrier layer provides substantially uniform gas transmission therethrough around its periphery, and
inner and outer surface layers, said inner surface layer extending completely around the interior of said tubular, multi-layer film, and said outer surface layer extending completely around the exterior of said tubular, multi-layer film, whereby said barrier layer is covered and protected from degradation.

8. The tubular, multi-layer film of claim 7 in which said central barrier layer consists of polyvinylidene chloride.

9. The tubular, multi-layer film of claim 7 in which said inner and outer surface layers consist of polyethylene.

10. The tubular, multi-layer film of claim 8 in which said central barrier layer and said adhesive layers are each approximately 0.00025 inch in thickness.

11. The tubular, multi-layer film of claim 10 in which said opposing, longitudially extending edges of said central barrier layer overlap by approximately two-thirds of an inch along said weld line.

12. A method of making a tubular, multi-layer film, comprising the steps of:

(a) extruding a block of material having a polyvinylidene chloride core and an adhesive covering into a first stream having a generally annular cross-section, said first stream having a central barrier layer of polyvinylidene chloride which overlaps along a longitudinally extending weld line by a substantial distance, (b) extruding polyethylene into a second stream having a generally annular cross-section, said second stream being positioned within said first stream and joined thereto by said adhesive, and (c) extruding polyethylene into a third stream having a generally annular cross-section, said third stream being positioned to surround said first stream and joined thereto by said adhesive.

13. The method of claim 12 in which the step of extruding a block of material having a polyvinylidene chloride core includes the step of extruding said first stream such that opposing longitudinally extending edges of said central barrier layer of polyvinylidene chloride overlap by approximately two-thirds of an inch and said central barrier layer of polyvinylidene chloride is between 0.00015 and 0.00060 inch is thickness, whereby said central barrier layer provides a generally uniform barrier to the passage of oxygen therethrough circumferentially around its periphery.

14. The method of claim 13 in which said first stream has a thickness of approximately 0.00075 inch.

15. The method of claim 13 in which said tubular, multi-layer plastic film is in the range of 0.00075–0.006 inch in thickness.

16. The method of claim 12 in which the step of extruding a block of material includes the step of extruding the first stream with a central barrier layer of polyvinylidene chloride which overlaps itself along opposing, longitudinally extending edges by a distance sufficient such that the polyvinylidene chloride forms a substantially uniform barrier around its periphery.

* * * * *